(12) United States Patent  
Pickren (10) Patent No.: US 6,363,609 B1  
(45) Date of Patent: Apr. 2, 2002

(54) METHOD AND APPARATUS FOR ALIGNING CRANKSHAFT SECTIONS

(75) Inventor: Gregory Bernard Pickren, Clearwater, FL (US)

(73) Assignee: Short Block Technologies, Inc., Clearwater, FL (US)

( * ) Notice: Subject to any disclaimer, the term of this patent is extended or adjusted under 35 U.S.C. 154(b) by 0 days.

(21) Appl. No.: 09/692,237

(22) Filed: Oct. 20, 2000

(51) Int. Cl.$^7$ ................................................. B23P 19/02
(52) U.S. Cl. ...................... 29/888.08; 29/6.01; 29/464; 29/468; 29/281.3; 29/281.5
(58) Field of Search .............................. 29/888.08, 6.01, 29/464–468, 281.1, 281.3, 281.4, 281.5, 281.6

(56) References Cited

U.S. PATENT DOCUMENTS

| | | |
|---|---|---|
| 4,979,335 A | 12/1990 | Weber et al. |
| 5,625,945 A | 5/1997 | Paro |
| 5,984,599 A | 11/1999 | Janssen |
| 6,173,628 B1 * | 1/2001 | Leith ........................ 29/888.08 |

FOREIGN PATENT DOCUMENTS

| | | | | |
|---|---|---|---|---|
| JP | 06-190654 A | * | 7/1994 | ............... 29/888.08 |
| WO | WO-81/03636 | * | 12/1981 | .................. 29/6.01 |

* cited by examiner

Primary Examiner—P. W. Echols  
Assistant Examiner—Eric Compton  
(74) Attorney, Agent, or Firm—Raúl V. Fonte (57) ABSTRACT

The invention discloses a method and an apparatus for aligning crankshaft sections such as center sections of so-called "pressed-together crankshafts" found in multiple-cylinder-engines of the type used in personal motorized watercrafts and snowmobiles. The alignment of these crankshaft sections is effected by a phasing tool comprised of two symmetrical machined steel cylinders which are mounted on a die shoe, facing each other in virtual image formation, and provided with specifically designed phasing and centering tools. The phasing tools are designed in accordance with the diameters of the peripheral pins of the journals of the crankshaft section and the stroke of the crankshaft. A centering tool is used to center the crankshaft section with respect to the machined steel cylinders, and a spacing tool, placed between the two webs of the crankshaft section, prevents the force of the hydraulic-actuatordriven upper plate of the die shoe from compressing the crankshaft section excessively. Alignment dowel pins are employed to set the desired precise radial orientation of the peripheral pins with respect to each other, e.g., 180° for twin-cylinder-engine crankshafts, 120° for three-cylinder-engine crankshafts, etc. The crankshaft section is aligned by inserting the peripheral pins of the journals inside the phasing tools and lining up the center longitudinal axis of the crankshaft section with a centering pin inside the centering tool. The webs may then be pressed together by causing the hydraulic-actuator-driven upper plate of the die shoe to compress the center section so as to permanently lock the journals in place and preserve the desired alignment.

17 Claims, 6 Drawing Sheets

Prior Art

TOP VIEW

SECTION VIEW

TOP VIEW

SIDE VIEW

FRONT VIEW

BOTTOM VIEW

Fig. 6

METHOD AND APPARATUS FOR ALIGNING CRANKSHAFT SECTIONS

FIELD OF THE INVENTION

The present invention relates to a method and apparatus for aligning crankshaft sections and, more particularly, to a method and apparatus for the high-precision phasing of crankshaft sections during the manufacture or reassembling of pressed-together multi-cylinder engine crankshafts. Specifically, the invention relates to a novel technique and tool for aligning the center sections of pressed-together crankshafts used in personal motorized watercraft and snowmobile engines.

BACKGROUND OF THE INVENTION

Crankshafts for precision machines must be accurately manufactured, or reassembled, to properly drive the engine components of the machines of which they are part. Methods and tools used in the manufacture of crankshafts are described in U.S. Pat. Nos. 4,979,335, 5,625,945 and 5,984,599. A most important aspect of such accurate manufacturing or reassembling is the alignment of the crankshaft sections. A crankshaft section usually comprises two "journals", connected by a center pin, and one or more associated bearings. A "journal" is an annular disc, or "web", with a peripheral pin transversely attached to it. Proper alignment of the crankshaft sections is particularly critical when the crankshaft sections are center sections of "pressed-together crankshafts", that is, crankshafts where the connecting center pins of at least some of the sections are press fit to one or both of the journals to which they are connected. Press fitting is the assembling of any two machined pieces by creating a bond between them as a result of the fact that one of them has been inserted within the other, so as to be properly in place, by the use of force. For example, a round connecting center pin may be press fit to a journal by providing, in the journal, an orifice with a diameter between 0.0002 and 0.004 inches smaller than the diameter of the pin, and forcing the pin into the orifice by mechanical exertion. Pressed-together crankshafts are built and reassembled by manufacturers and rebuilders such as Kawasaki, Polaris, Yamaha and others for combustion engines with several cylinders and, in particular, for combustion engines for personal motorized watercrafts, snowmobiles and similar vehicles. In contrast to pressed-together crankshafts, "single-piece crankshafts" are designed so that the journals and connecting center pins of their sections form one solid single piece, and the crankshafts themselves are usually forged in one piece. As a result, the crankshaft sections of single-piece crankshafts normally remain aligned so long as the main shaft is not accidentally bent. The crankshaft sections of pressed-together crankshafts, on the other hand, exhibit a tendency to fall out of phase during operation and as a result of normal tear and wear due to extended use. When this happens, the engines do not operate properly, or simply stop running, and they have to be taken apart so that the crankshaft sections may be properly aligned. Also, crankshafts often have to be taken apart to replace defective bearings and perform repairs or maintenance. When taken apart, the crankshaft sections usually fall out of phase and have to be re-aligned. Since crankshaft sections usually include two journals, the alignment of crankshaft sections is sometimes also referred to as the "alignment of crankshaft journals". Conventional crankshaft alignment techniques can be cumbersome and time-consuming, and add substantial costs to the building and reassembling of crankshafts, particularly when the crankshafts are pressed-together crankshafts. It is apparent that a need exists, then, to provide a technique and a tool for properly and quickly aligning crankshaft sections, and, in particular, for properly and quickly aligning crankshaft sections of pressed-together crankshafts in minimum time and with minimum expense.

SUMMARY OF THE INVENTION

An object of this invention is to provide a technique and a tool for accurately aligning crankshaft sections. An object of the instant invention is also to provide a method and an apparatus for accurately and rapidly aligning pressed-together crankshaft sections, which method and apparatus may be used on practically all kinds of pressed-together crankshafts regardless of their make or origin. Another object of the invention is to provide an inexpensive method and apparatus for properly aligning the crankshaft sections normally found in the multiple-cylinder combustion engines used in personal motorized watercrafts and snowmobiles. A further object of this invention is to provide a method and a tool for the accurate, rapid and inexpensive alignment of said crankshaft sections that can be used and operated by essentially one operator with minimum amount of training. These and other objects of the invention will become apparent from the disclosure that follows.

The above objects are achieved by the phasing station tool and method of the instant invention. When used properly and in accordance with the method disclosed herein, the phasing station of this invention allows one single operator to accurately align and assemble pressed-together crankshaft sections and provide the desired degree of orientation in minimum time and with minimum expense.

The phasing station of this invention comprises a housing (also referred to as a "die shoe"), a phasing fixture (also referred to as a "phasing jig"), and crankshaft spacing means (also referred to as a "spacing tool"). The housing (die shoe) comprises two rigid plates, mounted in parallel fashion with respect to each other, preferably one above the other, and a plurality of linear bearing sets, mounted in perpendicular fashion with respect to the two rigid plates and in parallel fashion with respect to each other. The two rigid plates are preferably made of steel, and, for convenience, are referred to in this description as the "upper plate" and the "lower plate". The linear bearing sets are preferably sets of hollow tubular members, concentrically mounted with respect to each other. The inner tubular members of the linear bearing sets are attached to the lower plate; the outer tubular members of the, linear bearing sets are attached to the upper plate and have a slightly larger diameter than the inner tubular members. Preferably, the upper plate has several perforations (holes) on its surface, spaced out and of such shapes and sizes as to allow for a press fit of the outer tubular members of the linear bearing sets; and, preferably, the lower plate has several perforations (holes) on its surface, spaced out and of such shapes and sizes as to allow for a press fit of the inner tubular members of the linear bearing sets. The upper plate of the die shoe is also provided with means for attaching a hydraulic actuator assembly to its surface so as to allow a hydraulic actuator to apply pressure to and move the upper plate towards to and away from the lower plate of the die shoe. The upper, plate also has at least two, preferably threaded, perforations for bolting or otherwise securing the upper portion of the phasing jig to the plate. The lower plate has multiple perforations for receiving the alignment dowel pins of the machined steel cylinder of the lower portion of the phasing jig and locking it into different positions, as described below.

The phasing fixture (phasing jig) consists of two substantially identical metal portions so attached or placed within the phasing station as to face each other in virtual image formation: one from the upper plate of the die shoe and the other one from the lower plate. Each such substantially identical metal portion comprises a machined steel cylinder, a phasing tool and a phasing tool lock down. In addition, the lower portion of the phasing jig also comprises a centering tool and a centering tool lock down. The following is a description of the lower portion of the phasing jig, which is attachable to the lower plate. It should be understood that, except for the fact that it does not have alignment dowel pins, an orifice for mounting a centering tool, a centering tool or a centering tool lock down, the concentrically mounted upper portion of the phasing jig is identical to the lower portion, attachable to the upper plate of the die shoe and, if desired, may also be made adjustable with respect to rotation.

The machined steel cylinder of the lower portion of the phasing jig is a block of machined steel provided with several alignment dowel pins and designed to house the centering tool and the phasing tool, and receive the phasing tool lock down bolt and the centering tool lock down bolt. The machined steel cylinder is provided with an orifice for mounting the centering tool. The orifice, which is preferably circular, is concentrically positioned along the central vertical axis of the cylinder and open at both ends of said vertical axis. The machined steel cylinder of the lower portion of the phasing jig also has a second orifice, which is preferably rectangular, flanking said vertical axis and also open at both ends of the axis, for housing the phasing tool. Threaded holes are also provided along the horizontal axis of the machined steel cylinder for receiving the phasing tool lock down bolt and the centering tool lock down bolt. Means are provided for securing the machined steel cylinder to the lower plate of the die shoe.

The centering tool consists of one or more flanged metal chambers, preferably cylindrical, housing a steel centering pin, a centering spring and a tension adjustment screw. The steel centering pin has a pointed end and slides in and out along the length of the flanged metal chambers. The centering spring applies tension to the centering pin at the end opposite the pointed end of the pin. The tension adjustment screw is threaded to screw in and out of one end of the flanged metal chambers so as to allow the operator to change and control the tension on the centering pin. The flanged metal chambers have a flange at one end that allows the chambers to be securely lodged inside the machined steel cylinder orifice for mounting the centering tool. The end of the flanged metal chambers opposite the flanged end is threaded on the inside so as to allow the tension adjustment screw to move in and out and increase or decrease tension as needed.

The centering tool lock down comprises means for pressing against the centering tool, so as to keep it in place, and an orifice through one of the sides of the phasing jig adapted to accept said means. Preferably, a threaded metal bolt long enough to penetrate the orifice along the horizontal axis of the machined steel cylinder until it contacts the centering tool is used.

The phasing tool consists of one or more metal blocks with a precisely positioned and sized circular orifice along the entire length of their vertical axes. The location and the diameter of the phasing tool circular orifice are unique to the crankshaft being built or reassembled. Specifically, the distance between the center location of the longitudinal axis of the phasing tool circular orifice and the center location of the longitudinal axis of the machined steel cylinder of the phasing jig should be one-half of the stroke of the crankshaft being assembled. One-half of the stroke of the crankshaft being assembled means one-half of the distance between the farthest point and the closest point reached by the connecting rods of said crankshaft as they move about its axis. In addition, the diameter of the phasing tool circular orifice should be sized as to provide a slip fit with the mating peripheral pin of the journal of the section being aligned, as described below.

The phasing tool lock down comprises means for pressing against the phasing tool, so as to keep it in place, and an orifice through one of the sides of the phasing jig adapted to accept said means. Preferably, the orifice is threaded and adapted to receive and keep in place a threaded metal bolt in perpendicular orientation with respect to the position of the phasing tool.

The crankshaft spacing means (spacing tool) consist of suitable means for preventing the force of the hydraulic-actuator-driven upper plate of the die shoe from compressing the crankshaft section too much and failing to achieve the proper crankshaft section dimensions. Preferably, the spacing tool is made of metal and includes two identical wedge-shaped primary halves and two rectangular-shaped plates, or height-adjusting members. The four pieces constitute a loose assembly that can be screwed together or otherwise assembled by means of strategically positioned screws and/or pins. When screwed or bolted together, the four pieces form a rectangular assembly whose height is the same as the width of the center section of the crankshaft being built or reassembled. The width of the center section of the crankshaft being built or reassembled means the distance between the two webs of said center section. The height-adjusting members of the spacing tool act as a base for the two identical wedge-shaped primary halves and, for convenience, can be made unique to the crankshaft that is being assembled. Specifically, the height of the two rectangular-shaped plates can be made to vary, depending on the crankshaft being assembled, to provide the necessary height to the four-piece assembly while allowing the operator to use the same two wedge-shaped primary halves in all alignment operations. Therefore, each spacing tool may have one or more sets of height-adjusting members.

In aligning a crankshaft section, two phasing tools are chosen in accordance with the diameters of the two peripheral pins of the journals of the crankshaft section and the stroke of the crankshaft being assembled. The two phasing tools are placed into the orifices for housing the phasing tool of the machined steel cylinder of the upper portion of the phasing jig and the machined steel cylinder of the lower portion of the phasing jig, respectively. The centering tool is inserted into the orifice for mounting the centering tool of the machined steel cylinder of the lower portion of the phasing jig. The components of the spacing tool are then selected, according to the specific requirements of the crankshaft being assembled, and the spacing tool installed between the two webs of the crankshaft section being aligned. The machined steel cylinder of the lower portion of the phasing jig is rotated with respect to the machined steel cylinder of the upper portion of the phasing jig to set the precise angular distance between the two peripheral pins of the crankshaft section at the desired radial orientation, e.g., 180° for twin-cylinder-engine crankshafts, 120° for three-cylinder-engine crankshafts, etc. The alignment dowel pins are next inserted into the perforations in the base of the lower portion of the phasing jig to lock the angular distance between the two peripheral pins at the set orientation. The crankshaft section is then placed in the phasing station by inserting the two peripheral pins of the journals inside the circular orifices of the two phasing tools and lining up the center longitudinal axis of the connecting center pin of the crankshaft section with the tip of the steel centering pin inside the centering tool. At this point, the desired alignment orientation has been achieved. After adjusting the tension on the steel centering pin with the tension adjustment screw to provide a flushed surface between the two journals and the flange of the centering tool, the two webs are pressed together by causing the upper plate of the die shoe to compress the center section so as to permanently lock the journals in place and preserve the desired alignment.

BRIEF DESCRIPTION OF THE DRAWINGS

The invention will now be described in connection with a preferred embodiment and with reference to the accompanying drawings, wherein.

DETAILED DESCRIPTION OF THE INVENTION

Figure 1:
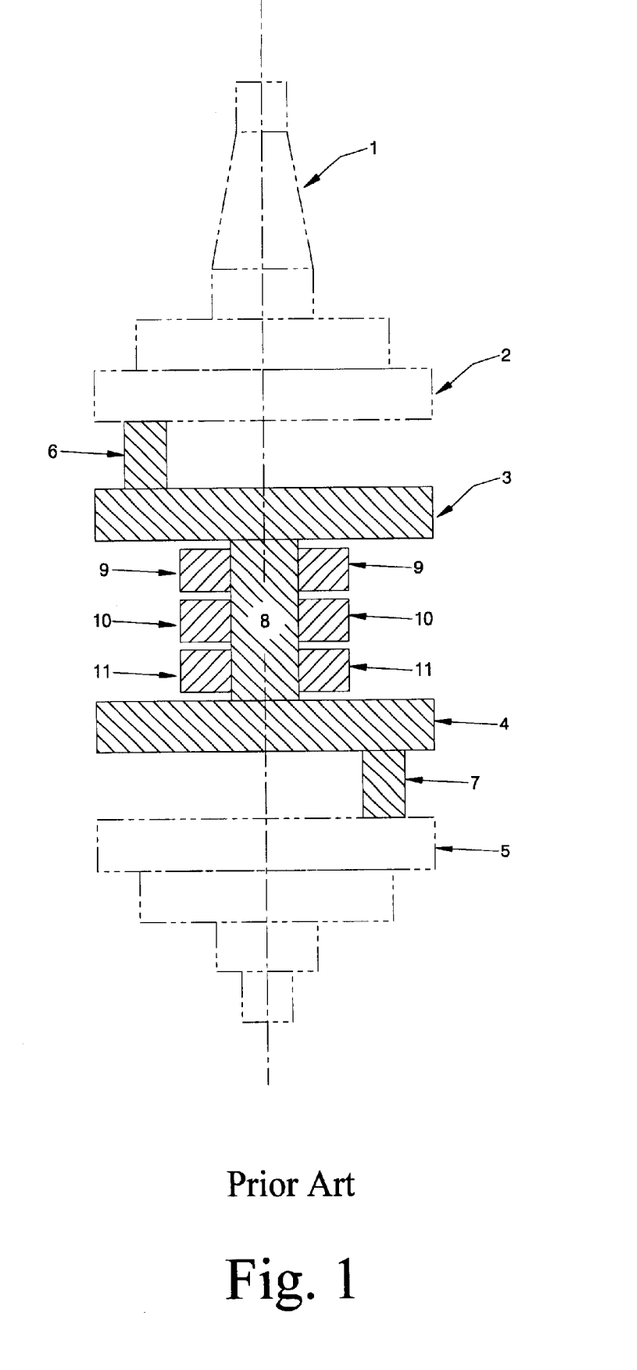
FIG. 1 is a vertical elevation of a crankshaft that employs crankshaft sections such as those which are aligned by the phasing station and method of this invention.

By way of an illustration, a crankshaft section of the type that may be aligned by the phasing tool and method of this invention is depicted in FIG. 1, where pressed-together crankshaft 1 includes webs 2, 3, 4 and 5. Each web is an annular metal disc provided with an opening for receiving a metal pin. Webs may be round, square, tulip-shaped, elliptical or of any other suitable shapes. Webs 2, 3, 4 and 5 are round. Web 2 is connected to web 3 by peripheral pin 6, which is press fit into web 3 and may be either press fit or forged into web 2. Web 3 is connected to web 4 by means of connecting center pin 8, which is press fit into web 3 and may be either press fit or forged into web 4. Concentrically mounted ball bearings 9, 10 and 11 surround connecting center pin 8. Web 4 is connected to web 5 by means of peripheral pin 7, which is press fit into web 4 and may be either press fit or forged into web 5. A crankshaft section of the type that may be aligned by the phasing tool and method of this invention comprises two journals, attached to each other by a connecting center pin, and one or more associated bearings. In FIG. 1, that section comprises peripheral pin 6, web 3, connecting center pin 8, associated bearings 9, 10 and 11, web 4 and peripheral pin 7. A multiple-cylinder-engine crankshaft may have one or more of these sections. In fabricating these and similar crankshaft sections, a hydraulic ram is used to press fit two journals with a connecting center pin; the journals are then aligned, and the aligned journals press fit to other identical or similar journals. The end result is the fabricated pressed-together crankshaft. In this process, it is important that the webs remain parallel in relation to each other and that the angular orientation of the peripheral pins of the webs be set precisely at the desired angle, i.e., 180° for two-cylinder-engine crankshafts, 120° for three-cylinder-engine crankshafts, 90° for four-cylinder-engine crankshafts, etc. Peripheral pins 6 and 7, in FIG. 1, are shown in a 180° angular orientation with respect to each other, as pressed-together crankshaft 1 is ideally suited for a two-cylinder-engine of the type often used by manufacturers of personal motorized watercrafts and snowmobiles.

Figure 2:
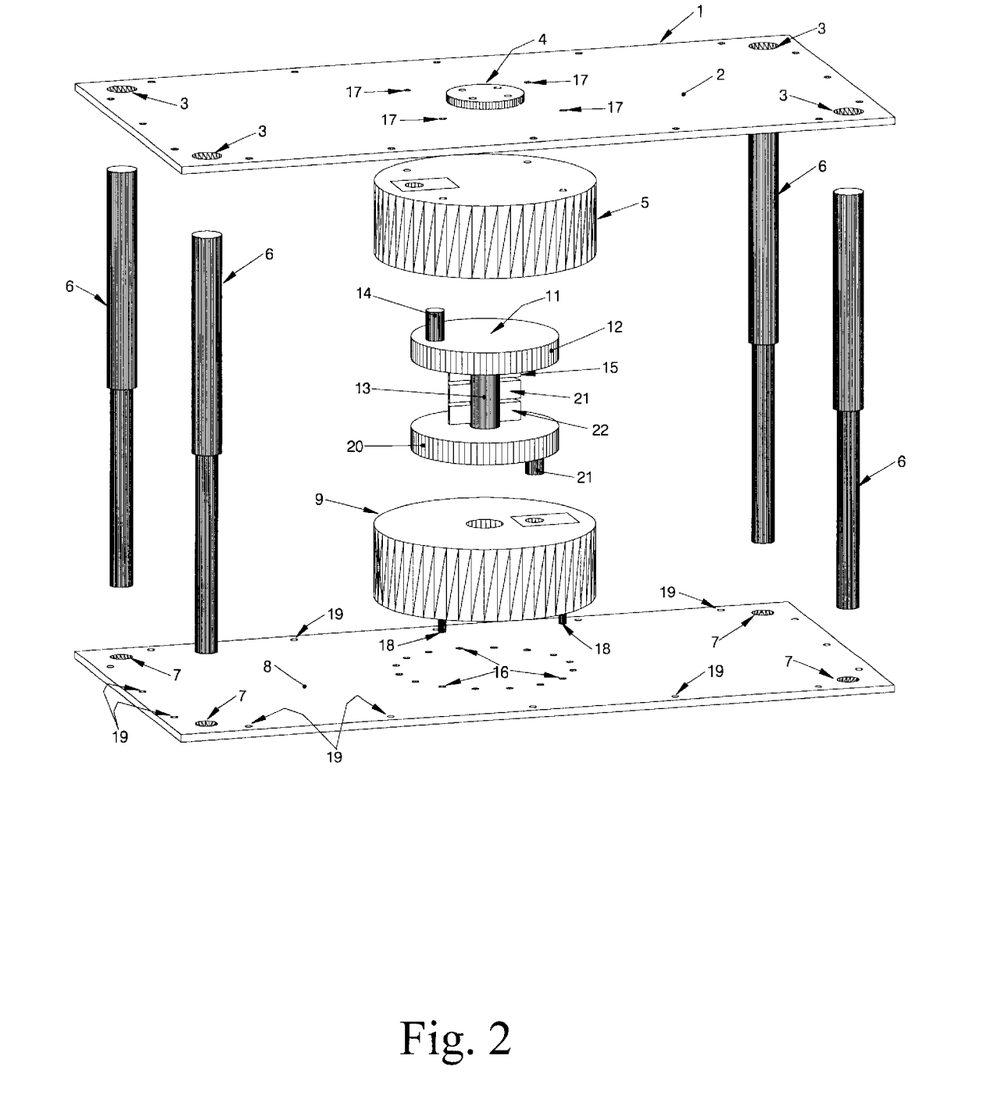
FIG. 2 is a general schematic plan view of an apparatus (phasing station) according to the invention, including the housing (die shoe), the phasing fixture (phasing jig) and the crankshaft spacing means (spacing tool), and shows the placement of a crankshaft central section in the phasing station as it is prepared for alignment.

The crankshaft section described above in conjunction with FIG. 1 is shown in FIG. 2 as crankshaft section 11. In FIG. 2, phasing tool 1 comprises the die shoe, the phasing jig and the spacing tool of the invention. The die shoe includes rigid plates 2 and 8, which are shown mounted, one above the other, in parallel fashion with respect to each other, and four linear bearing sets 6, mounted in parallel fashion with respect to each other and in perpendicular fashion with respect to the two rigid plates. Preferably, each linear bearing set is mounted on or near each of the four corners of the upper plate and the lower plate.

Linear bearing sets 6 are sets of hollow tubular members, concentrically mounted with respect to each other. The inner tubular members of linear bearing sets 6 are press fit into four perforations 7 on the lower plate, while the outer tubular members of the bearing sets are press fit into four perforations 3 on the upper plate and have a slightly larger diameter than the inner tubular members. Alternatively, the linear bearing sets may be bolted to the lower plate and to the upper plate of the die shoe. Upper plate 2 of the die shoe is also provided with metal plate 4 for attaching a ram, or similar hydraulic actuator assembly, to its surface so as to allow the ram to move upper plate 2 towards to and away from lower plate 8 of the die shoe. Upper plate 2 also has four threaded perforations 17 for bolting the upper plate to machined steel cylinder 5 of the upper portion of the phasing jig. Die shoe lower plate 8 has a number of precisely positioned perforations 16 for receiving alignment dowel pins 18, which are attached to and part of machined steel cylinder 9 of the lower portion of the phasing jig. Machined steel cylinder 9 is provided with at least two threaded holes which are used to bolt the cylinder to die shoe lower plate 8 after dowel pins 18 have been inserted into perforations 16. Die shoe lower plate 8 also has four threaded perforations 19 for bolting the lower plate to a table, counter top or other suitable means for providing support to the phasing station. Perforations 16 are positioned on die shoe lower plate 8 so as to permit the phasing jig operator to select different configurations of perforations in which to insert alignment dowel pins 18 and thereby achieve the desired angular orientation of machined cylinders 5 and 9 with respect to each other. Preferably, at least four alignment dowel pins 18 are used in each configuration. The most often desired orientations are 180° for aligning twin-cylinder-engine crankshafts, 120° for aligning three-cylinder-engine crankshafts, and 90° for four-cylinder-engine crankshafts.

The two substantially identical metal portions of the phasing jig are attached to the die shoe rigid plates so as to face each other in virtual image formation: one from the upper plate and the other one from the lower plate. The lower portion of the phasing jig, attached to the lower plate by means of the alignment dowel pins and bolts, comprises a machined steel cylinder, a phasing tool, a phasing tool lock down orifice, a centering tool and a centering tool lock down.

Figure 3:
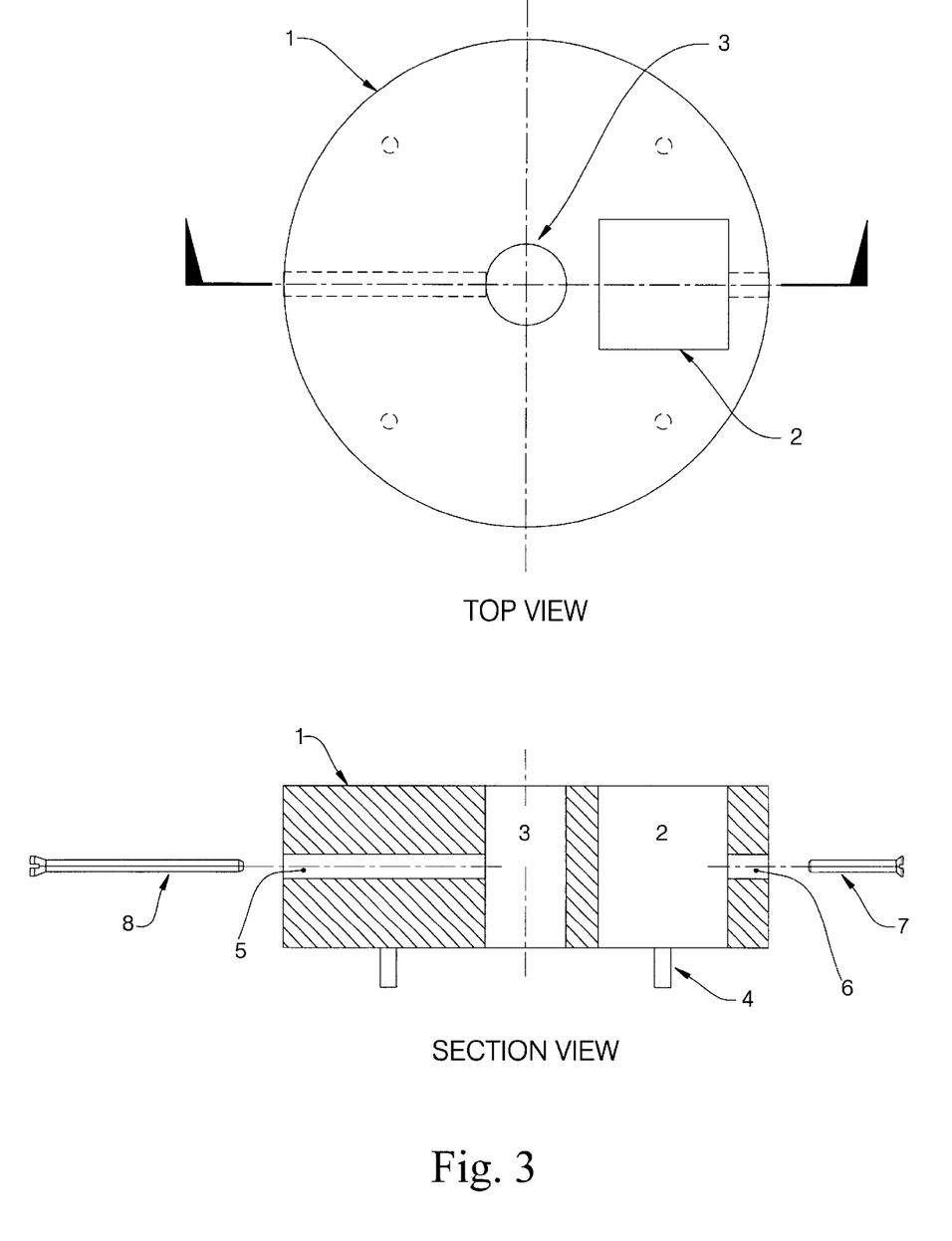
FIG. 3 includes a top view and a section view of the lower portion of the phasing fixture (phasing jig) of the invention, including the machined steel cylinder of said lower portion, and shows the locations of the orifice for mounting the centering tool, the orifice for housing the phasing tool, the phasing tool lock down and the centering tool lock down.

The machined steel cylinder of the lower portion of the phasing jig is a block of machined steel provided with several alignment dowel pins and designed to house the centering tool and the phasing tool, and receive the phasing tool lock down bolt and the centering tool lock down bolt. A top view and a section view of the machined steel cylinder of the lower portion of the phasing jig are shown in FIG. 3, where machined steel cylinder 1 is provided with four alignment dowel pins 4. Alignment dowel pins 4 are attached to or near the bottom of machined steel cylinder 1 and are used to mount the cylinder to the lower plate of the die shoe at the desired angular orientation with respect to the machined steel cylinder of the upper portion of the phasing jig. Orifice 3, for mounting the centering tool, is preferably circular, and is concentrically positioned along the central vertical axis of the cylinder and preferably open at both ends of said vertical axis. The diameter of orifice 3 should be large enough to receive and provide a slip fit with the centering tool, as described below. Machined steel cylinder 1 also has an orifice 2, which is preferably rectangular, flanking said vertical axis and also preferably open at both ends of the axis, for housing the phasing tool. In addition, threaded hole 6 is provided along the horizontal axis of machined steel cylinder 1 for receiving phasing tool lock down bolt 7; and threaded hole 5 is provided along the horizontal axis of cylinder 1 for receiving centering tool lock down bolt 8. The dimensions of orifice 2 should be large enough to accommodate the phasing tool and provide a slip fit with it. The exact location of orifice 2 within machined steel cylinder I may vary, depending on the size and particular configuration of the phasing tool, as will be seen from the description below.

Figure 4:
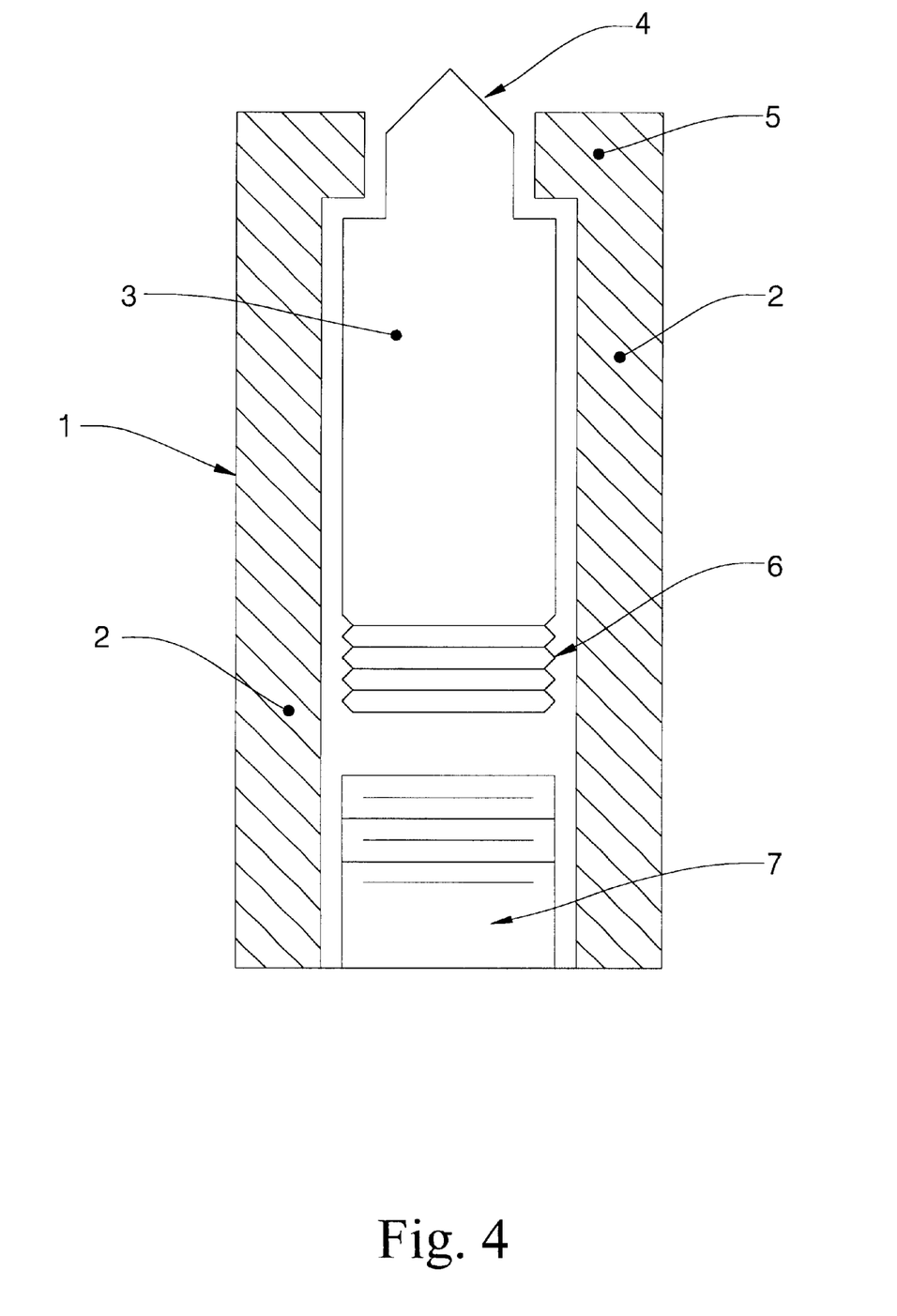
FIG. 4 is a lengthwise section view of the preferred embodiment of the centering tool showing the steel centering pin, the centering spring and the tension adjustment screw.

The centering tool, shown in FIG. 4, is housed in the machined steel cylinder of the lower portion of the phasing jig and consists of one or more flanged elongated metal chambers, preferably cylindrical, housing a steel centering pin, a centering spring and a tension adjustment screw. In FIG. 4, centering tool 1 includes steel centering pin 3, which has pointed end 4 and slides in and out along the length of flanged metal cylinder 2. Centering spring 6 applies tension to steel centering pin 3 at the end opposite pointed end 4. Tension adjustment screw 7 is threaded to screw in and out of one end of flanged metal cylinder 2 so as to allow the operator to change and control the tension on centering pin 3. Flanged metal cylinder 2 is provided with flange 5, at one end, that prevents the unintentional spring-forced dislodging of steel centering pin 3 from its housing. The end of flanged metal cylinder 2 opposite the flanged end is threaded on the inside so as to allow tension adjustment screw 7 to move in and out and increase or decrease tension as needed.

The preferred centering tool lock down consists of one or more threaded holes along the horizontal axis of the machined steel cylinder and one or more corresponding bolts for pressing against the centering tool so as to keep it in place. The embodiment shown in FIG. 3 consists of single threaded hole 5, along the horizontal axis of cylinder 1, and centering tool lock down bolt 8, which should be long enough to completely penetrate orifice 5 and contact the centering tool.

Figure 5:
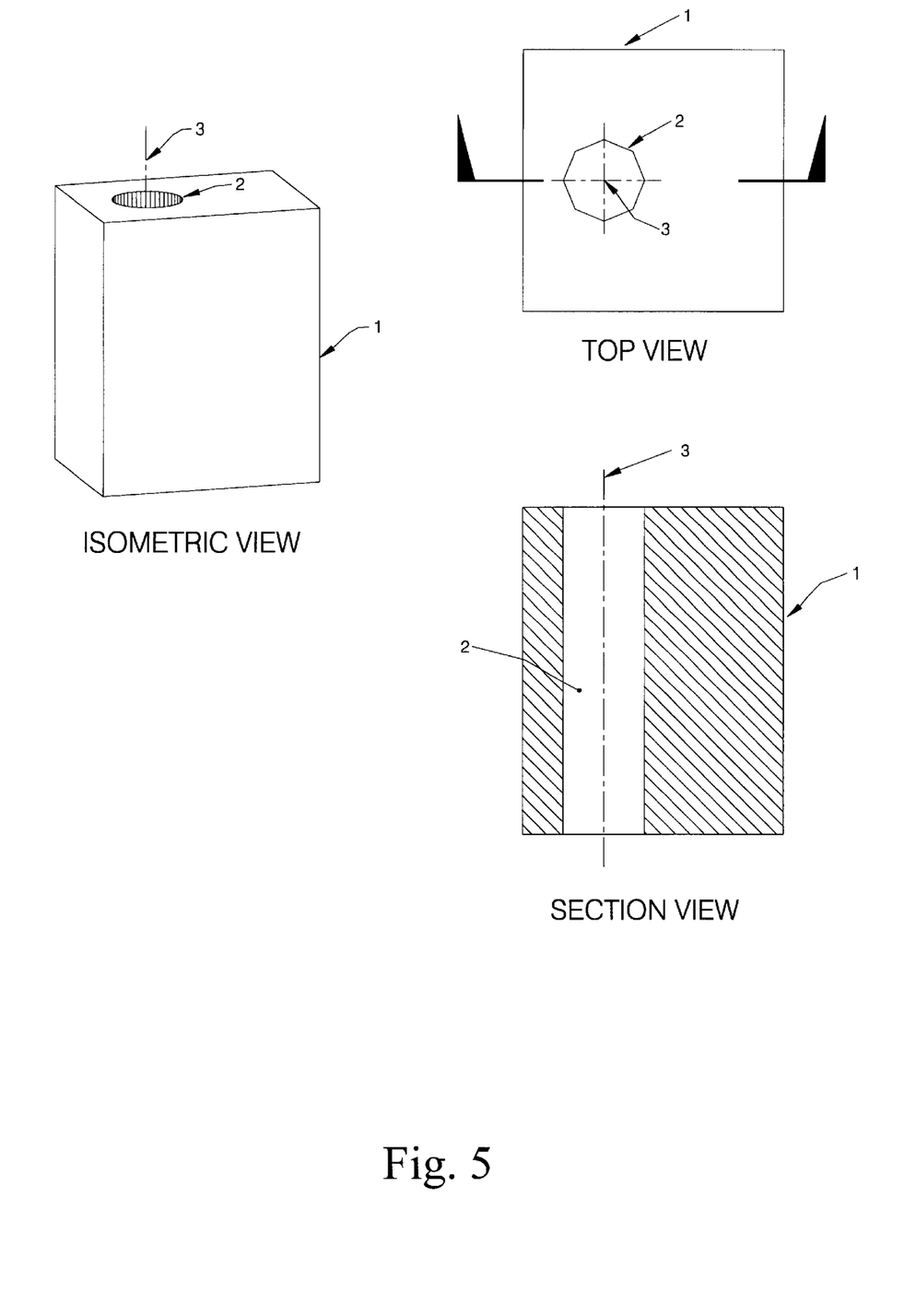
FIG. 5 includes an isometric view of a phasing tool, along with a top view and a section view of the same phasing tool.

The phasing tool depicted in FIG. 5 consists of one or more metal blocks with a precisely positioned and sized circular orifice along the entire length of their vertical axes. The shape and the size of each block may vary, depending on convenience of design, but the location and the diameter of the phasing tool circular orifice are unique to the crankshaft being built or reassembled. Specifically, the distance between the center location of the longitudinal axis of the phasing tool circular orifice and the center location of the longitudinal axis of the machined steel cylinders of the phasing jig is one-half of the stroke of the crankshaft being assembled, i.e., one-half of the distance between the farthest point and the closest point reached by the connecting rods of said crankshaft as they move about its axis. Thus, phasing tool 1 in FIG. 5 is a rectangular block provided with circular orifice 2 along the entire length of vertical axis 3, and is fabricated so that, when mounted inside rectangular orifice 2 of FIG. 3, the distance between the center location of vertical axis 3 in FIG. 5 and the center location of vertical axis 3 in FIG. 3 is exactly one half of the stroke of the crankshaft being assembled. In addition, the diameter of phasing tool circular orifice 2 in FIG. 5 is sized as to provide a slip fit with mating peripheral pin 21 of web 20 in FIG. 2.

The preferred phasing tool lock down consists of one or more threaded holes along the horizontal axis of the machined steel cylinder and one or more corresponding bolts for pressing against the phasing tool so as to keep it in place. The embodiment shown in FIG. 3 consists of single threaded hole 6, along the horizontal axis of machined steel cylinder 1, and phasing tool lock down bolt 7, which should be long enough to completely penetrate orifice 6 and contact the phasing tool.

Figure 6:
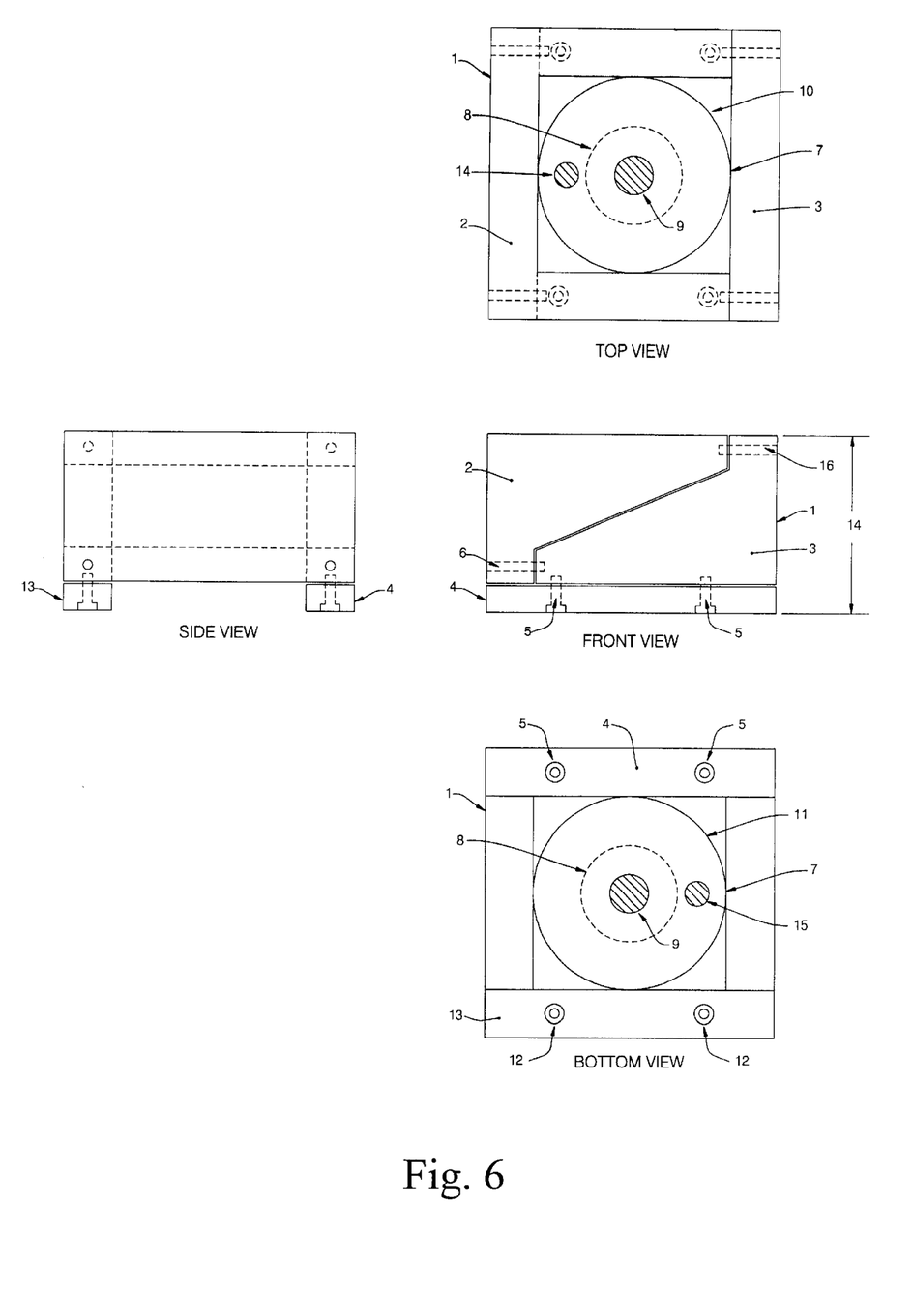
FIG. 6 includes a front view, a side view, a top view and a bottom view of the preferred crankshaft spacing means (spacing tool), and shows the components of the spacing tool already assembled and the placement of a crankshaft section as it is prepared for alignment.

The crankshaft spacing means of the phasing station serve the purpose of preventing the force of the hydraulic-actuator-driven upper plate of the die shoe from compressing the crankshaft section too much and failing to achieve the proper crankshaft section dimensions. Preferably, the spacing tool includes two identical wedge-shaped primary halves and two rectangular-shaped plates, or height-adjusting members, which constitute a loose assembly that can be screwed together by means of strategically positioned screws. The front view of spacing tool 1 depicted in FIG. 6 shows wedge-shaped primary halves 2 and 3 and height-adjusting member 4. Wedge-shaped primary halves 2 and 3 are assembled by mean of strategically positioned screws 6 and 16, while height-adjusting member 4 is attached to wedge-shaped primary half 3 by means of strategically positioned screws 5. The top view of FIG. 6 depicts the same spacing tool 1 assembled and positioned within the phasing station so as to fit around crankshaft section 7, which is being aligned. Crankshaft section 7 includes upper web 10, associated ball bearings 8, upper peripheral pin 14 and connecting center pin 9. Assembled wedge-shaped primary halves 2 and 3 make a tight fit around crankshaft section 7. The bottom view of FIG. 6 depicts the same spacing tool 1 assembled and positioned within the phasing station so as to fit around crankshaft section 7, including lower web 11, associated bearings 8, lower peripheral pin 15 and connecting center pin 9. Bottom screws 5 secure height-adjusting member 4 to wedge-shaped primary half 3, while bottom screws 12 secure height-adjusting member 13 to wedge-shaped primary half 3. Wedge-shaped primary halves 2 and 3 and height-adjusting members 4 and 13 are sized and assembled so that the four pieces form a rectangular assembly whose height is the same as the width of the center section of the crankshaft being built or reassembled. The height of the assembly formed by wedge-shaped primary halves 2 and 3 and height-adjusting members 4 and 13 is shown on the front view of FIG. 6 as height 14. The width of the center section of the crankshaft being built or reassembled means the distance between the two webs of said center section. Height-adjusting members 4 and 13 act as a base for wedge-shaped primary halves 2 and 3, and, for convenience, may be made in different sizes, designed to match the characteristics of the crankshaft that is being assembled, so that each spacing tool may have one or more sets of height-adjusting members. Specifically, the height of height-adjusting members 4 and 13 may be made to vary, depending on the dimensions of the crankshaft being assembled, to provide the necessary height to the four-piece assembly while allowing the operator to use the same two wedge-shaped primary halves in all of the alignment operations.

An example will now be given of how to conduct a crankshaft section alignment in accordance with the method of this invention utilizing the phasing tool described herein. A typical crankshaft section of the type aligned by the method of this invention is crankshaft section 11, depicted in FIG. 2. Crankshaft section 11 consists of webs 12 and 20, connecting center pin 13, peripheral pins 14 and 21, and concentrically mounted ball bearings 15, 21 and 22. Peripheral pins 14 and 21 are 1¼-inch-diameter round metal cylinders press-fit into webs 12 and 20, respectively, and oriented with respect to each other at an angular distance of 180°. Webs 12 and 20 are 1-inch-thick round discs measuring approximately 4 inches in diameter, and connected to each other in press fit fashion by 2-inch-diameter round connecting center pin 13 so that the distance between the lower surface of web 12 (as depicted in FIG. 2) and the upper surface of web 20 is 6 inches. To align crankshaft section 11 by the method of this invention, two phasing tools are first chosen in accordance with the diameters of peripheral pins 14 and 21. Since, in this case, the diameters of both peripheral pins are the same, both of the chosen phasing tools will have 1¼-inch-diameter circular orifices. The operator then looks up the stroke of the crankshaft, or, if not readily available, determines it by measuring the distance between the farthest point and the closest point reached by the connecting rods of the crankshaft as they move about its axis. The stroke of the crankshaft of which center section 11 is a part is 3 inches. Accordingly, the two phasing tools are chosen so that, when placed into the orifices for housing them, the distance between the center location of the longitudinal axes of their circular orifices and the center location of the longitudinal axis of the machined steel cylinders of the phasing jig is 1½ inches. In FIG. 3, the center location of the longitudinal axis of the machined steel cylinders of the phasing jig is shown as the center point of circular orifice 3. The center location of the longitudinal axes of the circular orifices of the two phasing tools is shown in FIG. 5 as longitudinal axis 3 of circular orifice 2. The two phasing tools are placed into the orifice for housing the phasing tool of the machined steel cylinder of the upper portion of the phasing jig and the orifice for housing the phasing tool of the machined steel cylinder of the lower portion of the phasing jig, respectively. Next, the centering tool is inserted into the orifice for mounting the centering tool of the machined steel cylinder of the lower portion of the phasing jig. The components of the spacing tool are then selected, according to the specific requirements of the crankshaft being assembled, and the spacing tool placed between the two webs of the center section being aligned. Thus, wedge-shaped primary halves 2 and 3 and height-adjusting members 4 and 13, as depicted in FIG. 6, are selected and assembled with the help of screws 5, 6, 12 and 16 so that the four pieces form a rectangular assembly whose height 14 is 6 inches, which is the vertical distance between upper web 10 and lower web 11 of crankshaft center section 7. The lower portion of the phasing jig is then rotated, and the alignment dowel pins are next inserted into the perforations in the base of the lower portion of the phasing jig to set the desired precise radial orientation of the two peripheral pins with respect to each other, e.g., 180° for twin-cylinder-engine crankshafts, 120° for three-cylinder-engine crankshafts, etc. In the case of crankshaft section 11 depicted in FIG. 2, the four alignment dowel pins 18 (about 1 inch in length and ¼ inch in diameter), which are part of the base of machined steel cylinder 9 in the lower portion of the phasing jig, are inserted into four of about 20 or more ¼-inch-in-diameter perforations 16 in lower plate 8 of the die shoe to set the radial orientation of peripheral pins 14 and 21 with respect to each other at precisely 180°. Crankshaft section 11 is then placed in phasing station 1 by inserting peripheral pins 14 and 21 inside the circular orifices of the two phasing tools and lining up the center longitudinal axis of the connecting center pin of crankshaft section 11 with the tip of the steel centering pin inside the centering tool, thereby achieving the desired alignment. After adjusting the tension on the steel centering pin with the tension adjustment screw to provide a flushed surface between the two journals and the flange of the centering tool, upper web 12 and lower web 20 are pressed together by causing upper plate 2 of the die shoe to compress center section 11 so as to permanently lock the journals in place and preserve the desired alignment.

In the foregoing disclosure, the alignment apparatus of the present invention and most of its components have been described as made of steel. While the preferred material of construction is steel, and, in particular, steel that may be hardened to a Rockwell B Scale hardness of 68 or higher, it should be understood that the phasing tool and its components may be fabricated of any other metal or material so long as said metal or material is strong and hard enough to support the stresses and compression forces inherent in aligning and fabricating most commercial crankshafts.

Although the foregoing description and drawings describe and illustrate in detail the preferred and other embodiments of the present invention, said description and drawings will suggest other modifications and different embodiments without thereby departing from the spirit and scope of the present invention, which is intended to be limited only by the scope of the claims that follow.

I claim:

1. An apparatus for aligning a crankshaft section with respect to the angular orientation of its peripheral pins, said apparatus comprising:

(a) a housing;

(b) a phasing jig, supported by said housing, comprising an upper bearing portion and a lower bearing portion facing each other in virtual image formation and rotably adjustable with respect to each other, each such bearing portion having means for receiving the peripheral pins of said crankshaft section and aligning their angular positions with respect to each other, said means for receiving the peripheral pins of said crankshaft section comprising at least one block provided with an orifice along the length of its vertical axis, said orifice sized so as to provide a slip fit with said peripheral pins and positioned so that the linear distance between the center location of its longitudinal axis and the center location of said bearing portion is one-half of the stroke of the crankshaft of which said crankshaft section is a part;

(c) means for centering the longitudinal axis of said crankshaft section with respect to the longitudinal axis of at least one of said bearing portions;

(d) means for installing said means for receiving the peripheral pins of said crankshaft section and aligning their angular positions with respect to each other within said upper bearing portion and lower bearing portion; and (e) means for mounting said upper bearing portion and lower bearing portion on the housing.

2. The apparatus of claim 1, wherein said housing comprises two rigid plates, mounted in parallel fashion with respect to each other, and means, attached to each such rigid plate, for allowing linear displacement of said two rigid plates with respect to each other.

3. The apparatus of claim 2, wherein said means for allowing linear displacement of the two rigid plates with respect to each other comprise a plurality of linear bearing sets mounted in perpendicular fashion with respect to said two rigid plates and in parallel fashion with respect to each other, and at least one of said two rigid plates is provided with means for attaching a hydraulic actuator to its surface.

4. The apparatus of claim 3, further comprising means for preventing said rigid plate provided with means for attaching a hydraulic actuator to its surface from compressing said crankshaft section excessively.

5. The apparatus of claim 4, wherein said means for preventing excessive compression of said crankshaft section comprise a set of rigid metal parts, capable of being assembled in rectangular fashion and concentrically mountable around said crankshaft section, and arranged such that the height of said set of rigid metal parts, when assembled, equals the width of said crankshaft section.

6. The apparatus of claim 1, wherein said block is a rectangular metal block, and wherein said precisely positioned and sized orifice is substantially round.

7. The apparatus of claim 1, wherein each such bearing portion comprises a machined steel cylinder and said means for installing said means for receiving the peripheral pins of said crankshaft section and aligning their angular positions with respect to each other comprise an orifice, flanking the vertical axis of said machined steel cylinder and open at both ends, for housing said means for receiving the peripheral pins of said crankshaft section.

8. The apparatus of claim 7, wherein the machined steel cylinder which comprises at least one of said bearing portions is provided with a plurality of dowel pins, attachable to said housing in a plurality of angular positions, to thereby effect said rotable adjustment of said bearing portions with respect to each other.

9. The apparatus of claim 8, wherein said machined steel cylinder provided with a plurality of dowel pins comprises said lower bearing portion of said phasing jig.

10. The apparatus of claim 7, wherein said means for centering the longitudinal axis of said crankshaft section with respect to the longitudinal axis of at least one of said bearing portions comprise at least one flanged metal cylinder housing a steel centering pin and means for applying and controlling tension to said steel centering pin.

11. The apparatus of claim 10, wherein said steel centering pin has a pointed end, and said means for applying and controlling tension to said steel centering pin comprise a spring and a tension adjustment screw located within the housing of said flanged metal cylinder at the end opposite the pointed end of said steel centering pin.

12. The apparatus of claim 7, wherein said means for centering the longitudinal axis of said crankshaft section with respect to the longitudinal axis of at least one of said bearing portions are located within said lower bearing portion and center the longitudinal axis of said crankshaft section with respect to the longitudinal axis of said lower bearing portion.

13. A method of aligning a crankshaft section with respect to the angular orientation of its peripheral pins, said crankshaft section having two webs connected by a center pin, each web having a peripheral pin attached to it, said method comprising:

(a) providing two phasing tools, each having means for receiving said peripheral pin attached to each of said two webs, said means for receiving said attached peripheral pin comprising a metal block provided with an orifice along the length of its vertical axis, said orifice sized so as to provide a slip fit with said attached peripheral pin and positioned within said metal block so that the linear distance between the center location of its longitudinal axis and the center location of said bearing portion is one-half of the stroke of the crankshaft of which said crankshaft section is a part;

(b) installing said two phasing tools within two machined steel cylinders;

(c) mounting said machined steel cylinders, with said two phasing tools installed therein, on a supporting housing in virtual image formation and rotably adjustable with respect to each other;

(d) inserting each said peripheral pin of the crankshaft section into each said means for receiving said peripheral pins of the two phasing tools; and (e) centering the longitudinal axis of said crankshaft section with respect to the longitudinal axis of said machined steel cylinders.

14. A method according to claim 13, wherein said centering of the longitudinal axis of said crankshaft section with respect to the longitudinal axis of said machined steel cylinders is effected by means of a flanged metal cylinder that houses a steel cylinder pin and means for applying and controlling tension to said steel centering pin.

15. A method according to claim 13, wherein said supporting housing comprises two rigid plates, mounted in parallel fashion with respect to each other, and means, attached to each of such rigid plates, for allowing the linear displacement of said two rigid plates with respect to each other.

16. A method according to claim 13, further comprising the steps of:

(a) measuring the linear distance between said two webs connected by a center pin of said crankshaft section;

(b) providing a set of rigid metal parts concentrically mountable around said crankshaft section and capable of being assembled in rectangular fashion so that the height of said set of rigid metal parts equals said linear distance between said two webs; and (c) installing said set of rigid metal parts between said two webs, concentrically around said crankshaft section, to thereby prevent excessive compression of the webs during the alignment operation.

17. A method of aligning a crankshaft section of a pressed-together crankshaft with respect to the angular orientation of its peripheral pins, said crankshaft section having two webs connected by a center pin, each web having a peripheral pin attached to it, said method comprising:

(a) installing two metal blocks within a first machined steel cylinder and a second machined steel cylinder, each said metal block having a circular orifice sized as to provide a slip fit with said peripheral pins of said crankshaft section and positioned within said metal block so that the linear distance between the center location of its longitudinal axis and the center location of the machined steel cylinder in which said metal block is installed is one-half of the stroke of the crankshaft of which said crankshaft section is a part;

(b) mounting said first machined steel cylinder and second machined steel cylinder, with said two metal blocks installed therein, on a supporting housing facing each other in virtual image formation, said first machined steel cylinder provided with means for centering the longitudinal axis of said crankshaft section with respect to the longitudinal axis of both machined steel cylinders and with a plurality of dowel pins, attachable to said supporting housing in a plurality of angular positions, to thereby allow an angular adjustment of said first machined steel cylinder and second machined steel cylinder with respect to each other;

(c) rotating said first machined steel cylinder with respect to said second machined steel cylinder so as to provide the desired angular distance between said two peripheral pins of the crankshaft section, and attaching said plurality of dowel pins to said supporting housing to thereby lock said first machined steel cylinder with respect to said second machined steel cylinder at said desired peripheral pin angular distance;

(d) determining the linear distance between said two webs connected by a center pin of said crankshaft section;

(e) providing a set of rigid metal parts concentrically mountable around said crankshaft section and capable of being assembled in rectangular fashion so that the height of said set of rigid metal parts equals said linear distance between said two webs;

(f) installing said set of rigid metal parts between said two webs and concentrically around said crankshaft section to thereby prevent excessive compression of the webs during the alignment operation;

(g) inserting each said peripheral pin of the crankshaft section into each such metal block circular orifice sized so as to provide a slip fit with said peripheral pins;

(h) centering the longitudinal axis of said crankshaft section with respect to the longitudinal axis of both machined steel cylinders; and (i) compressing said two webs with respect to each other by applying pressure to said supporting housing in an amount sufficient to press fit said center pin connecting said two webs into at least one of said two webs.

* * * * *